United States Patent [19]

Jenkner

[11] Patent Number: 4,833,954
[45] Date of Patent: May 30, 1989

[54] PLATE SUBDIVIDING AND SORTING MACHINE

[76] Inventor: Erwin Jenkner, Lindenstr. 13, D-7261 Gechingen-Bergwald, Fed. Rep. of Germany

[21] Appl. No.: 48,015

[22] Filed: May 8, 1987

[30] Foreign Application Priority Data

| May 20, 1986 | [DE] | Fed. Rep. of Germany | ....... 3616954 |
| May 26, 1986 | [DE] | Fed. Rep. of Germany | ....... 3617678 |
| Jun. 13, 1986 | [DE] | Fed. Rep. of Germany | ....... 3619945 |

[51] Int. Cl.⁴ .................. B26D 7/32; B65G 65/00; B65G 47/46
[52] U.S. Cl. .................................. 83/27; 83/35; 83/56; 83/156; 83/158; 83/404
[58] Field of Search .............. 83/156, 158, 155.1, 83/256, 404, 404.2, 35, 27; 271/307, 184; 198/362, 364, 367–370

[56] References Cited

U.S. PATENT DOCUMENTS

| 4,317,397 | 3/1982 | Ess | ................... 83/404.2 X |
| 4,341,135 | 7/1982 | Ufermann et al. | ............. 83/404.2 X |
| 4,381,686 | 5/1983 | Ess | ................... 83/404.2 X |

FOREIGN PATENT DOCUMENTS

| 2021610 | 11/1970 | Fed. Rep. of Germany . |
| 2145011 | 5/1972 | Fed. Rep. of Germany . |
| 2308906 | 12/1976 | Fed. Rep. of Germany . |
| 2523183 | 12/1976 | Fed. Rep. of Germany . |
| 2702725 | 4/1978 | Fed. Rep. of Germany . |
| 2459571 | 5/1983 | Fed. Rep. of Germany . |
| 1388718 | 5/1972 | United Kingdom . |

Primary Examiner—Frank T. Yost
Assistant Examiner—Rinaldi Rada
Attorney, Agent, or Firm—Herbert Dubno

[57] ABSTRACT

A plate subdividing and sorting machine includes a variegated subdividing device which subdivides the respective plate blank into final products arranged in the thus subdivided plate blank in respective longitudinal and transverse strips. The subdivided plate blank is shifted onto a stripping-off tray with which there is associated a stripping arrangement which strips the respective longitudinal strips off of the stripping-off tray and onto distributing roller conveyors which distributes the final products of the respective longitudinal strips in a sorted manner in accordance with their sizes to a plurality of adjacently arranged supply roller conveyors. The stripping arrangement includes a stripping blade which is movable, for the reduction of the cycle time, together with the remainder of the stripping arrangement, to at least two of the distribution roller conveyors that are arranged at a distance next to one another to deposit the longitudinal strips thereon.

4 Claims, 1 Drawing Sheet

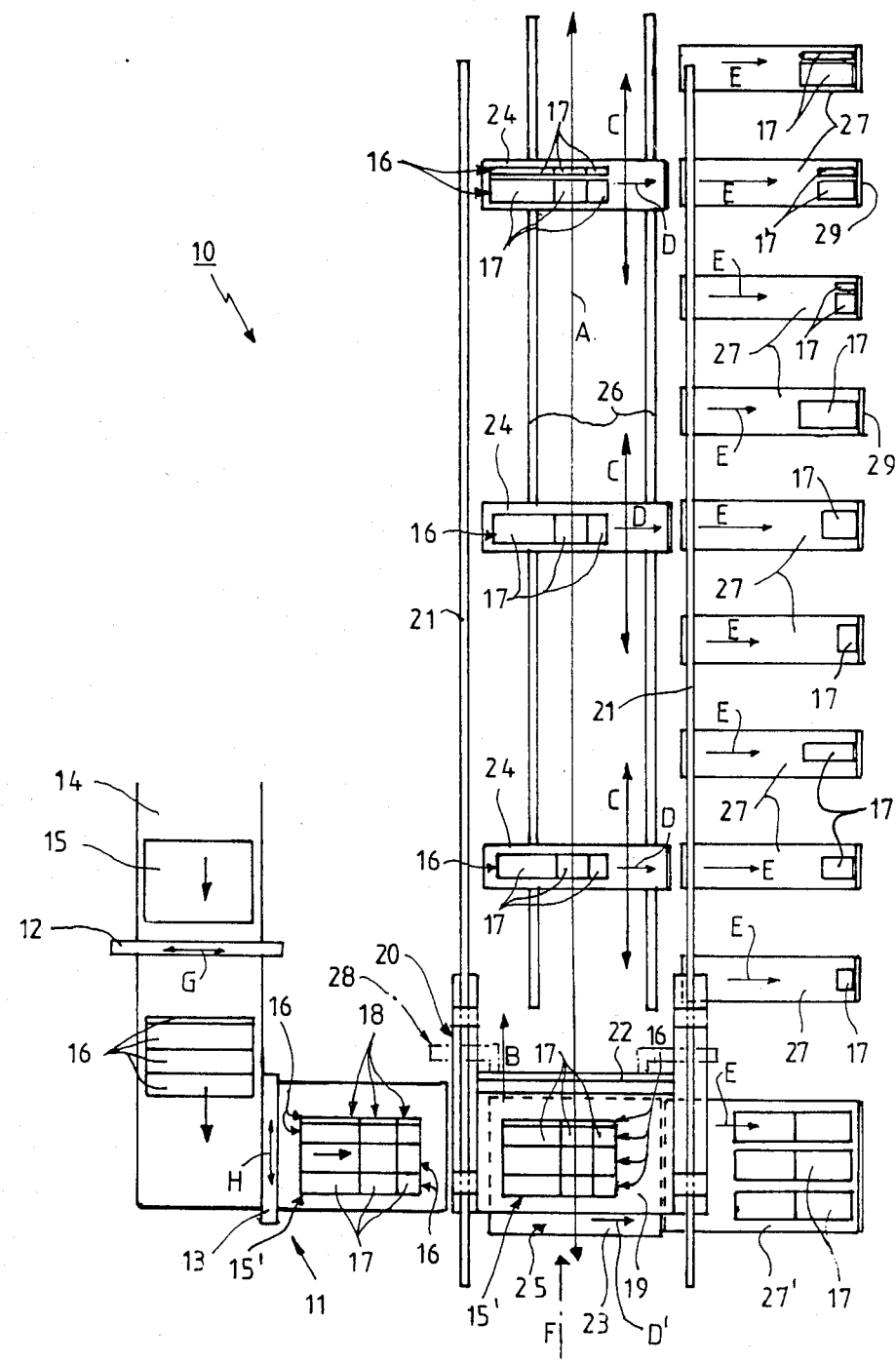

PLATE SUBDIVIDING AND SORTING MACHINE

BACKGROUND OF THE INVENTION

The present invention relates to arrangements for treating and handling plate-shaped objects in general, and more particularly to a plate subdividing and sorting machine.

There are already known various arrangements capable of sawing or otherwise subdividing and distributing or sorting plate-shaped objects, among them such including a variegated subdividing arrangement that includes a plurality of sawing devices that perform longitudinal and transverse cuts and are thus capable of sawing a plate blank, which consists of a single plate or of a plate packet, into equally or differently wide longitudinal and transverse strips in order to obtain in this manner from the plate blank a multitude of final products that may have different sizes. In this context, it is also already known to transfer the respective subdivided plate blank onto a shiftable stripping-off tray and to provide a stripping device which is associated with the stripping-off tray and which strips the longitudinal strips of the respective subdivided plate blank in succession off transversely to the longitudinal direction of the longitudinal strips from the stripping-off tray. A distributing arrangement is then used for distributing the final products of different sizes which are obtained from the subdivided plate blanks to a plurality of roller conveyors.

One construction of the plate subdividing and sorting machine of this type is known, for instance, from the German published patent application DE-OS No. 27 02 725. In this machine, the stripping-off tray with the associated stripping arrangement is associated only with a height-adjustable lifting table onto which all of the longitudinal strips of a subdivided plate blank are shifted in each instance. The plate blanks are transferred from the lifting table via a roller conveyor to a transverse transportation carriage which is capable of moving to a plurality of roller conveyors which are arranged at a distance from each other and parallel to one another and at the ends of which there are arranged respective stacking arrangements.

In this known plate subdividing and sorting machine, the achievable cycle time, that is, the time interval at which plate blanks can be presented in succession to the variegated subdividing arrangement, is determined by the operating time of the component which operates at the slowest pace. In this previously proposed machine, such slowest component is the transverse transportation carriage and the distribution of the final products of different sizes, which are in each instance situated thereon and of which each consists of a number of superimposed final objects corresponding to the number of superimposed plates in the respective plate blank, to the various roller conveyors due to the operation of the transverse transportation carriage. More particularly, the longitudinal strips of a subdivided plate blank, which are jointly transferred to the transverse transportation carriage in each instance in the direction of their longitudinal directions and which often have different widths, frequently consist of differently long final products in each of the longitudinal strips, and these differently wide and differently long final products are to be transferred or distributed to different ones of the roller conveyors. Thus, when the respective longitudinal strip includes final products of different lengths, then this longitudinal strip cannot be transferred to the roller conveyor in a single stroke; rather, the transverse transportation carriage must be moved, to accomplish the distribution, to the different roller conveyors for the transfer of the differently long final products of the longitudinal strip to the respective roller conveyors. This results in long cycle periods.

SUMMARY OF THE INVENTION

Accordingly, it is a general object of the present invention to avoid the disadvantages of the prior art.

More particularly, it is an object of the present invention to provide a subdividing and sorting machine which does not possess the drawbacks of the known machines of this type.

Still another object of the present invention is to devise a machine of the type here under consideration which is particularly advantageous as far as the throughput of the machine is concerned.

It is yet another object of the present invention to design the above machine in such a manner as to be able to obtain considerably shorter cycle times than heretofore possible.

A concomitant object of the present invention is so to construct the machine of the above type as to be relatively simple in construction, inexpensive to manufacture, easy to use, and yet reliable in operation.

In keeping with these objects and others which will become apparent hereafter, one feature of the present invention resides in an arrangement for subdividing a succession of plate blanks into final products and sorting such final products according to their respective sizes, this arrangement comprising variegated subdividing means including a plurality of sawing devices that subdivide the respective plate blank by a plurality of longitudinal and transverse cuts into respective longitudinal and transverse strips each including a number of the final products; a shiftable stripping-off tray for receiving the respective subdivided plate blank from the subdividing means; and means for distributing the final products in accordance with their sizes, including conveying means including at least two roller conveyors extending substantially parallel to the longitudinal strips of the subdivided plate blank supported on the stripping-off tray, means for shifting the stripping-off tray into at least two positions in each of which the stripping-off tray is aligned with one of the roller conveyors, and means for stripping the longitudinal strips of the respective subdivided plate blank in succession off from the stripping-off tray and onto respective different ones of the conveyors transversely to the longitudinal direction of the longitudinal strips.

By resorting to the present invention as described so far, it is possible to achieve a rapid and simple sorting distribution of the longitudinal strips of subdivided plate blanks, and thus of their final products, in accordance with their widths, from the stripping-off tray which is movable along a predetermined path to the roller conveyors of the conveying means that are arranged along the predetermined path of movement of the stripping-off tray so that the stripping-off tray can move from one of the roller conveyors to another to serve them with the respective longitudinal strips. Herein, one longitudinal strip or possibly even a plurality of the longitudinal strips of the same width or of different widths from the same subdivided plate blank can be transferred to the respective roller conveyor to which the stripping-off tray has moved From these roller conveyors, there may be accomplished a further conveyance of these longitudinal strips to removing stations or to other roller conveyors which transport the longitudinal strips or the final products constituting such longitudinal strips further, preferably while continuing the sorted distribution of the final products of different sizes, that is, while continuing the sorting operation.

The plate subdividing and sorting machine or arrangement of the present invention provides the possibility to operate with shorter, and in many cases even with much shorter, cycle times than those accomplished by the arrangement according to the afore mentioned German published patent application DE-OS No. 27 02 725. The shorter the cycle times of such a machine, the higher are the economy of such a machine and the degree of its efficiency. Also, the capacity of the variegated subdividing arrangement, which is capable of subdividing the plate blanks into equally wide or even into differently wide longitudinal and transverse strips so that in the extreme case all of the final products obtained from the subdivided plate blank may have different sizes, is being utilized in a correspondingly better manner. Herein, it can be provided that the number of the roller conveyors to which the stripping-off tray may move is so great that in all or in many instances all of the longitudinal strips of different widths can be transferred from the stripping-off tray to different ones of the roller conveyors, or also that there can be transferred to at least one of such roller conveyors a plurality of the longitudinal strips having different widths More particularly, the shortening of the cycle times can be achieved even alone by the fact that the stripping-off tray is capable of distributing the differently wide longitudinal strips of a subdivided plate blank that are supported thereon directly even to a plurality of roller conveyors, wherein the individual longitudinal strip is transferred to the respective conveyor transversely to its longitudinal direction, and this consumes only a small amount of time because of the relatively small width of the longitudinal strip. Immediately after the distribution of the longitudinal strips from the stripping-off tray onto the respective roller conveyors, the stripping-off tray can move back to its initial position and is able to receive the next following subdivided plate blank. Of course, it is necessary, in order to be able to achieve this immediate return of the stripping-off tray, to make provisions for preventing the stripping-off tray and also the stripping arrangement from abutting or contacting any longitudinal strips which may still be supported on the roller conveyors. This can be accomplished, for instance, by lifting or upwardly pivoting the stripping-off tray with the stripping arrangement for the return movement thereof, and/or by lowering the roller conveyors or the like which carry such longitudinal strips. The further transportation or the distribution of the final products of the longitudinal strips which have been transferred from the stripping-off tray to the roller conveyors can take place from the roller conveyors, during the period of time during which the stripping-off tray is still occupied by the distribution of the longitudinal strips to other roller conveyors and by its return to the initial position This will be explained on the basis of an example. It will be assumed for this example that the stripping-off tray can move only to two roller conveyors total. These two roller conveyors may be mounted stationarily or, preferably, at least one of these roller conveyors may be movable transversely to its longitudinal direction. The final products of different sizes obtained from a subdivided plate blank then can be distributed to these two roller conveyors in a sorted manner in two groups, independently of how many of the final products have different sizes, wherein each of such group may consist of final products of the same size or of different sizes. It will be further assumed for this example that a plate blank is subdivided into four longitudinal strips of which each may include a plurality of equally long or of differently long final products Under these circumstances, for instance, two of the longitudinal strips of the same width or of different widths obtained from the respective plate blank can be stripped off from the stripping-off tray onto one of the two roller conveyors, while the two remaining longitudinal strips which differ therefrom and which have an equal width or different widths with respect to one another are stripped off onto the other one of the two roller conveyors. This requires only a small amount of time It is further possible without encountering any difficulties, and it is currently preferred, to provide for the stripping-off tray to be already situated over one of the roller conveyors when in its initial position, so that it is accordingly possible to strip-off the first two of the longitudinal strips to this roller conveyor concurrently with the commencement of the travel of the stripping-off tray to the other one of the two roller conveyors, and no extra time is needed for accomplishing this operation; rather, what is being used is the time which is required in any event for the travel of the stripping-off tray to the other roller conveyor. After the stripping off of the next two of the longitudinal strips onto the other roller conveyor, the stripping-off tray returns into its initial position and is able to receive the next subdivided plate blank. Each of these roller conveyors is capable of accomplishing further transportation of the respective two longitudinal strips immediately after their deposition on the respective roller conveyor to a further transportation location, and thereafter the respective roller conveyor is again available for the reception of the longitudinal strips of the subdivided plate blank which is transferred to the stripping-off tray next and the final products of which, that have different sizes, may then be distributed, while also being sorted, to two groups which are constituted by the respective longitudinal strips (for example, in each instance two of the longitudinal strips again form a group of the final products) to the two roller conveyors.

In simple cases, the distribution arrangement of a machine according to the present invention may include only two of the roller conveyors to which the stripping-off tray may travel, and further roller conveyors and/or other receiving stations or further transport stations can be arranged downstream of these two roller conveyors. The roller conveyors to which the stripping-off tray is capable of traveling, can be stationarily mounted.

However, it is particularly advantageous when at least one of the roller conveyors to which the stripping-off tray may travel is mounted for movement tranversely to its own longitudinal direction, that is, when it is mounted on a carriage by means of which it can be moved transversely to its longitudinal direction. Such a roller conveyor then constitutes a distribution roller conveyor, which is capable of moving to different removing stations or further transportation stations. The further transportation stations can be preferably constituted by supply roller conveyors which then supply the final products that are transferred thereto in a sorted manner by the respective associated distribution roller conveyors to removing stations or to additional further transportation stations.

It is also possible that at least one of the distribution roller conveyors, to which the stripping-off tray may travel for the transfer of the longitudinal strips thereto, is constructed as a height-adjustable roller conveyor which can thus form the upper deposition plane of a lifting table.

The width of the roller conveyor of at least one such lifting table, preferably of the roller conveyor of at least one stationarily arranged lifting table and possibly also of at least one distribution roller conveyor, may be preferably so large that it is able to accept even the subdivided plate blanks obtained from plate blanks having the maximum width that can be handled by the machine. However, there may also be provided at least one stationary lifting table the height-adjustable roller conveyor of which is narrower than this maximum width of the plate blanks. It is also advantageous to provide for at least one of the distribution roller conveyors, but preferably for all of the distribution roller conveyors, to have a width which is narrower than corresponding to the maximum width of the plate blanks that can be processed on this machine.

It can advantageously be provided that at least one of the height-adjustable roller conveyors, but preferably all of the height-adjustable roller conveyors, to which the stripping-off tray can travel, is or are adjustable into different elevational positions, so that stacking can take place thereon and, in this manner, there can be obtained stacks of final products which are identical to one another Preferably, completely subdivided plate blanks may be stacked with simultaneous separation of their longitudinal strips or partial numbers of their longitudinal strips, or only individual longitudinal strips of such subdivided plate blanks may be stacked.

However, under these circumstances, all or each of the height-adjustable roller conveyors can cooperate in the distribution of the final products, without stacking the same.

In many instances, in order to achieve structural simplification and also reduction in the time required for the height adjustment of the respective roller conveyor, it may also be advantageously provided that at least one, but preferably all, of the height-adjustable roller conveyors is movable only into two different elevational positions, namely an upper elevational position which serves for the receipt of the longitudinal strips, and a lower elevational position which serves for the passage of the stripping-off tray during its return travel above the roller conveyor in question, this latter position also serving for the transfer of the final products to the supply roller conveyors.

The plates of the plate blanks may be, generally speaking, very large rectangular plates, the lengths of widths of which possibly amount to several meters, and which may consist of wood, synthetic plastic materials, metals, layered composite materials or laminates, or the like.

BRIEF DESCRIPTION OF THE DRAWING

The present invention will be described below in more detail with reference to the sole FIGURE of accompanying drawing which is a diagrammatic top plan view of an example of the construction of a plate subdividing and sorting machine in accordance with the present invention.

DETAILED DESCRIPTION OF THE PREFERRED EMBODIMENT

Referring now to the sole FIGURE of the drawing in detail, it may be seen that the reference numeral 10 has been used therein to identify a plate subdividing and sorting machine constructed in accordance with the present invention. The sorting and subdividing machine 10 includes a variegated subdividing sawing arrangement 11 including a longitudinal sawing device 12 and a transverse sawing device 13. The longitudinal sawing device 12 saws and subdivides a plate blank 15, which may be constituted by a single plate or by a plate packet consisting of a plurality of individual plates of the same size which are superimposed with one another in a stack, by means of cuts extending in a direction indicated by an arrow G, into longitudinal strips 16. Thereafter, the thus partially subdivided plate blank 15 is advanced to the transverse sawing device 13 Where it is sawed or subdivided, by means of cuts extending in a direction indicated by an arrow H, into transverse strips 18, so that the longitudinal strips 16 are subdivided into final products 17 of the subdividing arrangement 11. In the event that the plate blank 15 from which the final products 17 were obtained in this manner included a single plate, each of the final products 17 is an individual final object. On the other hand, in the event that the respective plate blank 15 included a plurality of superimposed plates, that is a plate packet, then each of the final products 17 consists of a corresponding plurality of individual final objects of corresponding sizes which are superimposed with one another and the respective edges of which are aligned with each other.

In the exemplary embodiment depicted in the drawing, the illustrated subdivided plate blank 15' includes four of the longitudinal strips 16 having different widths, and three of the transverse strips 18 also having different widths, resulting in a total of twelve of the final products 17 of different sizes Each of the final products 17 can consist of a single individual final object or of a plurality of superimposed individual objects the associated edges of which are aligned with one another. Naturally, there are also possible any other arbitrarily chosen subdivision patterns.

This subdivided plate blank 15' is then automatically shifted or stripped off away from the transverse sawing device 13 onto a horizontal strip-off tray 19 which may be constituted by a table plate, by a plurality of carriers which form a horizontal or tiltable support plane and which may form between themselves a plurality of parallel slots that advantageously extend in the stripping-off direction, by a grid, or the like. This stripping-off tray 19 is mounted on a suspension carriage 20 or on another carriage which is supported on stationary straight rails 21 situated upwardly of the machine 10 for to and fro movement in the directions indicated by a double-headed arrow A.

A stripping arrangement, which is also arranged on the carriage 20 or on a different carriage, is associated with the stripping-off tray 19. This stripping arrangement includes a stripping blade 22 or the like that is positionally adjustable with respect to the carriage 20 and to the stripping-off tray 19 parallel to the direction of movement of the carriage 20 and that serves for the shifting of the longitudinal strips 16 in a direction transverse to their longitudinal directions from the stripping-off tray 19, which at the same time respectively moves in the direction of an arrow B, onto adjacently situated roller conveyors 23 and 24, of which the roller conveyors 24 of the illustrated exemplary embodiment of the machine 10 are not adjustable as far as their elevations are concerned; however, it can also be provided to advantage in many cases that these roller conveyors 24 are made adjustable with respect to their elevations. These roller conveyors 23 and 24 are arranged parallel to one another. The stripping blade 22 is arranged in parallelism with the longitudinal direction of the longitudinal strips 16.

For the stripping of the respective longitudinal strip 16 from the stripping-off tray 19 onto one of the roller conveyors 23 and 24 which are arranged underneath the same, the stripping blade 22 does not move in the horizontal direction over the respective roller conveyors 23 and 24; rather, the stripping-off tray 19 is moved for this purpose in the direction of the arrow B perpendicularly to the longitudinal direction of the respective roller conveyors 23 and 24; this means that the stripping-off tray 19 is "withdrawn" from underneath the respective longitudinal strip 16 which is prevented from moving with the stripping-off tray 19 by the stripping blade 22. This can be achieved in different ways. When the stripping arrangement is arranged on its own carriage, which can advantageously be supported, similarly to the carriage 20, on the rails 21 for movement along the latter, and which is indicated in dash-dotted lines at 28, then the carriage 28 which carries the stripping blade 22 is halted for the stripping off of the respective one of the longitudinal strips 16 and the carriage 20 with the stripping-off tray 19 is moved further in the direction of the arrow B for the stripping-off of this longitudinal strip 16. In the alternative, the stripping-off tray 19 may be mounted on the carriage 20 for movement relative thereto parallel to its advancement path indicated by the arrow A. Under these circumstances, the carriage 20 may be halted, together with the stripping blade 22 which is then advantageously mounted on the carriage 20 and is positionally adjustable in a stepped fashion relative to the latter and to the stripping-off tray 19, for the stripping-off of the respective one of the longitudinal strips 16, and the stripping-off tray 19 is moved on the then immobilized carriage 20 in the direction of the arrow B while the stripping blade 22 is stationary, for the stripping-off of the respective longitudinal strip 16. There also exist other possibilities.

During this operation, the respective longitudinal strip 16 is in each case shifted off in its entirety perpendicularly to its longitudinal direction from the stripping-off tray 19 onto the respective straight roller conveyor 23 or 24 by the movement of the stripping-off tray 19 in the direction of the arrow B and by the action of the stripping blade 22 which is not being moved in the horizontal direction during this operation, that is, which is either stationary or, when the stripping-off tray 19 is inclined, is possibly moved slightly in the vertical directions, whereafter the thus stripped-off longitudinal strip 16 is supported on the respective roller conveyor 23 or 24, as illustrated, parallel to its longitudinal direction which also corresponds to a direction D or D' in which the rollers of this roller conveyor 23 or 24 is able to transport the longitudinal strips 16 which have been transferred thereto in their longitudinal directions as indicated by the arrows D or D'. In the event that, during this operation, two or more of the longitudinal strips 16 are shifted one after the other onto one and the same roller conveyor 23 or 24, it can be advantageously provided in a manner which is known by itself that these longitudinal strips 16 are separated on the respective roller conveyor 23 or 24 in such a manner that, after the shifting-off of one longitudinal strip 16, the stripping blade 22 is displaced by one step and, thereafter, the next following longitudinal strip 16 is again shifted off by the movement of the stripping-off tray 19 in the direction parallel to the movement direction A of the suspension carriage 20, as indicated by the arrow B, relative to the stripping blade 22 which is again not moved in the horizontal direction, and so on, as it is shown in an exemplary fashion for the two longitudinal strips 16 which are disposed on the rearmost roller conveyor 24.

The roller conveyor 23 constitutes the upper elevationally adjustable support plane of a stationarily arranged lifting table 25 and is arranged parallel to the three distribution roller conveyors 24 which are arranged in parallelism with one another next to each other. While the lifting table 25 is stationarily arranged, the three roller conveyors 24 are mounted on rails 26 for individual movement in the directions indicated by a double-headed arrow C, that is, perpendicularly to their longitudinal directions and thus parallel to the movement direction A of the suspension carriage 20.

The subdivision of the respective plate blank 15 on the variegated subdividing sawing arrangement 11, as well as the overall transfer or distribution of the respective subdivided plate blank 15' to one or more or all of the roller conveyors 23 and 24 and from them to one or more or all of illustrated supply roller conveyors 27 and 27' can be accomplished fully or partially automatically under the control of an appropriate program. If desired, there may also be provided manual controls or intervention possibilities.

Each of the roller conveyors 24 is advantageously at a standstill in a predetermined receiving position when one or more of the longitudinal strips 16 are being transferred thereto. Immediately thereafter, it can transport the final products 17 that are supported thereon, of which each is constituted by a single final object or of a plurality of superimposed individual final objects of the same size, in the longitudinal direction of the longitudinal strips 16 constituted thereby, that is, perpendicularly to the directions A, B and C and in the direction D, in a size-sorted manner, respectively to a plurality of the straight supply roller conveyors 27 that are arranged next to each other. To this end, each of the distributing roller conveyors 24 can be displaced in succession to a plurality of the supply roller conveyors 27 by transverse movement in accordance with the arrows C according to the respective program, stopping for a short period of time at each of such supply roller conveyors 27, in order to transfer thereonto during this operation, in a manner determined in accordance with the respective program, one or a plurality of the final products 17. Thus, in this exemplary embodiment, for the distribution of the longitudinal strips 16 shown to be supported on the roller conveyors 24, each of the front distribution roller conveyors 24 moves in succession to each of the three supply roller conveyors 27 for the transport in each instance of one of the final products 17 of the respective differently wide longitudinal strips 16. The rear distribution roller conveyor 24 transfers the differently long final products 17 of the two longitudinal strips 16 which are supported thereon to the three rear supply roller conveyors 27, and more particularly in each instance two equally long but differently wide final objects 17 to each of these three rear supply roller conveyors 27. Each of these supply roller conveyors 27 can then immediately transport the final product 17 or final products 17 transferred thereto in the advancement direction indicated by the respective arrow E, wherein these directions E are parallel to one another and to the directions D and D', to respective discharging stations Preferably, these final products 17 are transported to respective end abutments 29, from where they can be transported further. In this exemplary embodiment, for instance, the twelve final products 17 of different sizes contained in the original subdivided plate blank 15' were distributed by the three distribution roller conveyors 24 to the nine supply roller conveyors 27 in the depicted sorted manner; however, even other arbitrary distribution patterns are possible, depending on the subdivision pattern. In the event that it is desired that each of the twelve differently sized final products 17 be distributed to its own supply roller conveyor 27, then the machine 10 could be expanded for this purpose by the addition thereto of three further supply roller conveyors 27.

The direction A of movement of the carriage 20 and thus that of the stripping-off tray 19 which is entrained thereby for joint movement extends perpendicularly to the horizontally arranged roller conveyors 23 and 24 and also to the roller conveyors 27 and 27'.

Of course, the longitudinal strips 16 of the respective subdivided individual plate blank 15' can be distributed, depending on the subdivision pattern, only to one or two of the roller conveyors 24 and/or the roller conveyor 23, or to deposit the same only on the roller conveyor 23, as it was the case for the subdivided plate blank 15' which is shown to be situated on the roller conveyor 27', and so on.

The distribution roller conveyors 24 can be relatively narrow, inasmuch as they need not accept all of the longitudinal strips 16 of the respective subdivided plate blank 15' but only a fraction of the total number of such longitudinal strips 16, preferably only one or two of the longitudinal strips 16, as it is illustrated in this exemplary embodiment The width of these roller conveyors 24 can thus advantageously be smaller than the maximum width of the plate blanks 15 which are to be worked upon in this machine 10.

As a result of the movement of the suspension carriage 20, it is possible to move individually to all of the roller conveyors 23 and 24 in an arbitrarily chosen programmable manner and to distribute the longitudinal strips 16 of each of the subdivided plate blanks 15' to arbitrarily selected ones of these roller conveyors 23 and 24. As a result of the transverse displacement of each of the distribution roller conveyors 24 in the direction of the arrows C to differently selectable ones of the supply roller conveyors 27, the final products 17 of each of the longitudinal strip 16 can then be transferred in an arbitrarily selected manner in accordance with the respectively provided program to a number of different supply roller conveyors 27 and thus be distributed in a sorted manner in accordance with their lengths and widths. It can also be provided that, for different distribution patterns, at least two of the distribution roller conveyors 24 may be alternatively moved to at least some of the mutually parallel supply roller conveyors 27. It is also possible to transfer the longitudinal strips 16 in their entirety onto the supply roller conveyors 27, when the distribution pattern permits this. In this exemplary embodiment, it is shown, as already mentioned before, that a subdivided plate blank 15' has been distributed onto the roller conveyors 24 in that first one longitudinal strip has been stripped off onto the front roller conveyor 24 first, then a further longitudinal strip 16 has been stripped off onto the central roller conveyor 24, and the last two longitudinal strips 16 have been stripped off onto the rearmost roller conveyor 24. The two last longitudinal strips 16 were separated during this operation in a manner known by itself in that, after the stripping-off of the first longitudinal strip 16 from the stripping-off tray 19, the stripping blade 22 was positionally displaced by one step and thereafter the next following longitudinal strip 16 was stripped off onto the roller conveyor 24 first.

As soon as the respective roller conveyor 24 has received the respective longitudinal strip 16 or longitudinal strips 16, it can immediately commence the distribution of the final products 17 positioned thereon to a number of different supply roller conveyors 27. This can be accomplished while the suspension carriage 20 still moves to the roller conveyor 24 which is to be moved to next. These final products 17 may preferably have different lengths The supply roller conveyors 27 can also be constituted by narrow roller conveyors and may also be arranged at considerably smaller distances from one another or even without any distance adjacent to each other.

The roller conveyors 23 and 24 are driven roller conveyors which thus can be switched on and off for the transfer of the final products 17 therefrom to the supply roller conveyors 27 and 27'. As a result of the respective switching-on of one of the roller conveyors 23 and 24, it is possible to transfer one or more of the final products 17 which are respectively situated thereon in a predetermined manner to the supply roller conveyors 27 or 27' which preferably have slightly higher speeds. The supply roller conveyor 27', which is considerably wider than the supply roller conveyors 27, is associated with the roller conveyor 23. For the transfer of one or more of the final products 17 to one of the roller conveyors 27 or 27', the respective roller conveyor 24 or 23 is switched on for the advancement displacement required therefor or for the time period required therefor, for instance, in a time or advancement displacement programmed manner or in a lightbarrier controlled manner or in any other manner, and it then stops again as soon as the respective final product 17 is, or the respective final products 17 are, transferred to the respective supply roller conveyor 27 or 27'.

The distribution of the longitudinal strips 16, and that of their final products 17, of any arbitrary one of the subdivided plate blanks 15' to all of the roller conveyors 23 and 24 or some of them, and to the supply roller conveyors 27 and 27' or some of them, can also be accomplished in any arbitrary, preferably automatically controlled, manner which is suited to the respective subdivision pattern and is preferably programmable. It is also possible to transfer complete subdivided plate blanks 15' to the supply roller conveyor 27', preferably accompanied by separation of their longitudinal strips 16 on the roller conveyor 23 and possibly also stacking on this roller conveyor 23. More particularly, in this currently preferred exemplary embodiment, the roller conveyors 23 and 27' are somewhat wider than the maximum width of the plate blanks 15 which are to be handled by the machine 10, so that a subdivided plate blank 15' which is situated on the stripping-off tray 19 can be transferred in its entirety, with separation of its longitudinal strips 16, onto the roller conveyor 23. Herein, it is also possible to stack subdivided plate blanks 15' having the same shapes on the lifting table 25 and to transfer the entire stack, only after a predetermined stack height has been achieved, to the correspondingly deeply arranged roller conveyor 27' in that the drive of the roller conveyor 23 is switched on for this purpose.

The entire above-described operation sequence of the machine 10 can be accomplished in an automatically controlled programmed manner. On the roller conveyor 27' there are shown final products 17 from a previous subdividing operation, which need not be sorted since they all have the same size.

It is, of course, also possible not to transfer a complete subdivided plate blank 15' to the roller conveyor 23, but rather to transfer thereto only one or more of its longitudinal strips 16, and to transfer the remaining longitudinal strips 16 into one or more of the roller conveyors 24.

The rollers of the roller conveyors 23 and 24 may be rigidly connected with the stationarily mounted shafts which drive the same. In contradistinction thereto, however, it is particularly advantageous when the rollers of the supply roller conveyors 27 and 27' are frictionally driven. This can be achieved, for instance, in that these rollers are arranged on driven shafts for rotation, but are not rigidly connected with these shafts, so that they are capable of rotating relative to these shafts. Now, when a final product 17 is transferred, while the shafts are rotating, to this roller conveyor 27, the rollers are loaded by the final product 17 and are caused to rotate as a result of the friction between the same and the respective shafts, and thus transport the final product 17 up to the end abutment 29, or until this particular final product 17 abuts another final product 17 which is already being held by this end abutment 29. Thereafter, the rollers carrying the respective final product 17 are stopped by the latter, inasmuch as the friction between them and the respective final product 17 is greater than the friction between them and the respective shafts carrying such rollers Such a roller conveyor is designated as a friction roller conveyor. On the other hand, roller conveyors in which the rollers are positively driven and can be set into rotation or halted only by the switching-on or switching-off of the driving motor are designated as driven roller conveyors. Instead of using a friction roller conveyor, it is also possible, for the same purpose, to arrange the rollers for free rotation about their longitudinal axes at an endless link chain. Such a roller conveyor then also entrains the final products 17 transferred thereto for joint movement. When, however, the respective final product 17 abuts the end abutment 29 or a previously halted final product 17, then the rollers of this roller conveyor continuously slippingly rotate under the respective final product 17, without sliding thereon, while they, however, still support the final product 17. Therefore, the roller conveyor of this construction is technically equivalent to the friction roller conveyor. Both of these types of the roller conveyors can be advantageously used for the supply roller conveyors 27 and 27'.

The illustrated machine 10 may also have more or less than the illustrated three distribution roller conveyors 24 and also of the supply roller conveyors 27. In simple cases, the machine according to the invention may have only two of the distribution roller conveyors 24 or only a single distribution roller conveyor 24 and a lifting table 25 or only two stationarily arranged roller conveyors with a stripping-off tray which is movable relative thereto, and so on. Herein, the distribution roller conveyors 24 or at least one distribution roller conveyor 24 can, instead of moving to the different supply roller conveyors 27, move to other removing or transfer stations where the final products 17 are removed therefrom or transferred therefrom.

The removal from the mutually parallel supply roller conveyors 27 and 27' of the final products 17 which are preferably moved on the supply roller conveyors 27 and 27' until they abut the respective end abutments 29 can be accomplished in different ways. For instance, the removal of the two differently wide final products 17 from the rearmost supply roller conveyor 27 could be accomplished manually by an operator, for instance in such a manner that they are distributed, preferably via respective air-support paths, to the right and to the left to further processing stations, for instance, to stacking arrangements, intermediate storage devices, pallets or the like. Even when only one final product 17 arrives in each instance to the downstream end of the respective supply roller conveyor 27 or 27', it can then also be moved further by an operator, for instance also in an air-support path for the respective final product 17. Of course, even other removal possibilities exist, especially also automatic removal, for instance by gripping arrangements, shifting arrangements and the like.

It can also be provided that the shifting of the final products 17 on the supply roller conveyors 27 and/or on the supply roller conveyor 27' is accomplished, instead of by the rollers, by shifting devices or the like, or that these roller conveyors 27 or 27' are slightly inclined, so that the final products 17 advance thereon by themselves until they abut the end abutments 29 or any preceding final products 17 halted by such end abutments 29.

Even the shifting of the final products 17 onto the distribution roller conveyors 24 and onto the roller conveyor 23 of the lifting table 25 can be accomplished, instead of by driven rollers, in any other manner, for instance, by means of shifting devices.

The illustrated machine 10 is capable of subdividing or sawing the plate blanks 15 with much shorter cycle times than the previously proposed machine according to the German published patent application No. DE-OS 27 02 725 and of distributing the final products in a manner sorted in accordance with the sizes of such final products 17 to supply roller conveyors 27 and 27' which lead to removal stations.

When the plate blank 15 is a plate blank stack or packet including n superimposed plates, wherein n is an integral number, then the final products 17 formed from this plate blank 15 and arriving at the downstream ends of the supply roller conveyors 27 corresponding form packets or stacks consisting of n individual final objects.

In the illustrated machine 10, the stripping-off tray 19 may distribute the longitudinal strips 16 of the subdivided plate blank 15' which is shifted thereon to a plurality, in the illustrated exemplary embodiment to at the most four of the roller conveyors 23 and 24, for the sorting thereof, wherein the individual roller conveyors 23 or 24 may have supplied thereto, in accordance with the requirements, one or more of the longitudinal strips 16, wherein then the roller conveyors 23 or 24 which have the longitudinal strips 16 supplied thereto are able to perform further conveyance of these longitudinal strips 16, accompanied by a further sorting in accordance with final product sizes, while the stripping-off tray 19 already moves back to its starting station above the lifting table 25 and accepts the following subdivided plate blank 15'.

Herein, immediately after the supply of one or more of the longitudinal strips 16 to one of the distribution roller conveyor 24, the distribution of the final products 17 supported on such roller conveyor 24 to the supply roller conveyors 27 arranged downstream of the latter can immediately begin, while the stripping-off tray 19 still moves to the next following roller conveyor 24 and deposits one or more of the longitudinal strips 16 thereon Thus, each of the roller conveyors 24 can commence, immediately after the supply of one or more of the longitudinal strips 16 thereto, the distribution of the final products 17 which are transferred thereto in this manner, in accordance with their sizes, to different ones of the supply roller conveyors 27 and, while one or more of the roller conveyors 24 are still occupied with the distribution of the final products 17 that have originated from one subdivided plate blank 15', the first roller conveyor 24 can again be supplied with one or more of the longitudinal strips 16 originating from the next following subdivided plate blank 15' and commence the distribution. Therefore, it is possible by using the machine 10 according to the present invention to achieve an extraordinarily fluid, rapidly occurring, distribution of final products 17 obtained from plate blanks 15 that are subdivided by sawing in accordance with any subdivision patterns, with very short cycle times The machine 10 can then operate with a correspondingly high degree of efficiency, while utilizing the variegated subdividing device 11 more effectively than was heretofore possible, especially even when the longitudinal strips 16 of the respective subdivided plate blank 15' include final products 17 of different lengths which are to be distributed to different ones of the supply roller conveyors 27, as is shown in the illustrated exemplary embodiment.

Of course, care must be taken herein to assure that the stripping-off tray 19 and the stripping device which includes the stripping blade 22 cannot come into contact the longitudinal strips 16 which have been previously or already deposited on the roller conveyors 23 and 24. This can be achieved in different ways. For instance, the roller conveyors 24, as well as the roller conveyor 23, may be adjustable with respect to their elevation and may be lowered from their positions in which they accept the longitudinal strips 16 into lower positions thereof in which they transfer the final products 7 of the supply roller conveyors 27 or 27', and then lifted again. In the alternative, it may be provided, for instance, that the stripping-off tray 19 can be tilted from a horizontal position in which it accepts the respective subdivided plate blanks 15' into an inclinedly downwardly extending position in which the longitudinal strips 16 can be shifted down therefrom by the stripping blade 22. To this end, the stripping blade 22, for instance, may be so displaced as far as its elevation is concerned that it is held at a constant small distance or at no distance at all from the support surface or support surfaces of the stripping-off tray 19 carrying the longitudinal strips 16. In the alternative, the stripping blade 22 may remain at the same elevation during the stripping-off of the longitudinal strips 16 from the inclinedly arranged stripping-off tray 19 and may include fingers that are arranged in a rake-like fashion and extend into longitudinal slots of the stripping-off tray 19. The stripping arrangement and the stripping-off tray 19 may then be tilted up or otherwise raised again for the return movement of the carriage which carries the same, so that they are able to return into their initial or rest positions at a vertical distance from the longitudinal strips 16 which may still be supported on the roller conveyors 23 or 24 during this return movement.

For instance, the illustrated machine 10 with the three distribution roller conveyors 24 is able to operate at a speed which is a multiple of that achieved by the previously known machine in accordance with the German published patent application DE-OS No. 27 02 725 including merely a single transverse transportation carriage.

The machine 10 in accordance with the present invention is also programmable in an extraordinarily varying manner, renders it possible to achieve considerably shorter cycle times than heretofore possible. All this is accomplished at a relatively low structural expenditure. By using the machines 10 constructed in accordance with the present invention, it is possible to achieve the desired production capacities in a less expensive, structurally simpler, and more economical manner than by using the previously known arrangements in accordance with the German published patent application DE-OS No. 27 02 725. Also, the machines 10 in accordance with the present invention occupy only a relatively small amount of space, inasmuch as they render it possible to achieve a particularly compact arrangement.

In the illustrated exemplary embodiment, the rollers of the roller conveyors 23 and 24 further transport the longitudinal strips 16 which are placed thereon in the longitudinal directions of these longitudinal strips 16. This is particularly advantageous. However, it can be also provided under certain circumstances that the rollers of at least one of the roller conveyors 23 and 24 are so arranged that they can convey the longitudinal strips 16 that are placed thereon transversely to the longitudinal directions of such longitudinal strips 16. In this case, such rollers are preferably the rollers of the roller conveyor 23 of a stationarily arranged lifting table 25. The movable distribution roller conveyors 24 are not elevationally adjustable in the illustrated exemplary embodiment. However, it is also possible to make at least one of these roller conveyors 24 elevationally adjustable, preferably to make it possible to stack final products 17 having the same size thereon before they are transported further to the supply roller conveyors 27 that are arranged downstream therefrom.

It is also possible, in a manner which is not illustrated in the drawing, to construct and arrange the variegated sawing arrangement 11 in such a manner that it is capable of transferring the subdivided plate blanks 15' onto the stripping-off tray 19 which is situated in its receiving position not in the longitudinal direction of the longitudinal strips 16 thereof, but rather transversely thereto in the direction indicated by a dash-dotted arrow F.

It will of course, be understood that when referring to the longitudinal strips 16 of a subdivided plate 15' there are always meant those of the strips that are always transferred to the roller conveyors 23 and 24 intact, regardless of whether they are longer than, of the same length as, or shorter than the dimension of the subdivided plate blank 15' which extends transversely to the strips 16 and also parallel to the plane of the respective subdivided plate blank 15'. However, it can be provided in a currently preferred manner that, When the maximum base surface 0f the plate blanks 15 that are to be subdivided or saWed on the variegated saWing arrangement 11 is not square-shaped, the long side of this rectangular maximum basic surface is that side which extends parallel to the sawing direction which forms the longitudinal strips 16, inasmuch as the result of this, the distribution of the longitudinal strips 16 of the subdivided plate blank 15' can be performed more rapidly than otherwise because of the number of such longitudinal strips 16 which is smaller on the average, and it is possible to manage with a smaller number of the roller conveyors 23 and 24 which are served by the stripping-off tray 19. However, under certain circumstances, it can also be provided that the shorter side of the maximum basic surface of the plate blanks 15 having sizes that are at the maximum that can be handled by the machine 10 in accordance with the invention extends parallel to the longitudinal strips 16.

While the present invention has been described and illustrated herein as embodied in a specific construction of a plate subdividing and sorting machine, it is not limited to the details of this particular construction, since various modifications and structural changes are possible and contemplated by the present invention. Thus, the scope of the present invention will be determined exclusively by the appended claims.

What is claimed is:

1. A method of subdividing a plate-shaped bland and sorting pieces subdivided therefrom, said method comprising the steps of:

subdividing said blank longitudinally to form a plurality of longitudinal strips each extending in a longitudinal direction of said blank and also subdividing the longitudinal strips transversely to said longitudinal direction to subdivide said longitudinal strips into said pieces so that said pieces lie in rows parallel to said longitudinal direction and in rows extending in a transverse direction perpendicular to said longitudinal direction;

depositing said pieces in the shape of said blank on a stripping-off tray;

displacing said stripping-off tray horizontally in a first direction parallel to rows of said pieces extending in one of said longitudinal and and transverse directions and engaging all of the pieces on said tray with a stripping blade extending in a second direction perpendicular to said one of said directions for retaining all pieces present on said tray against movement in said first direction, thereby depositing the piece of at least one row of pieces extending in said direction and perpendicular to said first direction on at least one transfer roller conveyor disposed beneath said tray;

displacing at least one of said transfer roller conveyor in said first direction and aligning said transfer roller conveyor selectively with a plurality of receiving roller conveyors spaced apart in said first direction alongside a path of said transfer roller conveyor; and selectively depositing pieces of said at least one row extending in said second direction from said transfer roller conveyor onto said selected receiving conveyors by movement of a surface of said transfer rolling conveyors in said second direction perpendicular to said first direction by driving said transfer roller conveyor, thereby sorting said pieces.

2. The method defined in claim 1 wherein at least three transfer roller conveyors are disposable beneath said stripping-off tray, including at least one nonshiftable transfer roller conveyor permanently aligned with at least one of said receiving conveyors and at least two shiftable transfer roller conveyors movable in said first direction, said rows of pieces of said subdivided blank being selectively deposited onto selected ones of said transfer roller conveyors.

3. The method defined in claim 1 wherein said stripping blade is held stationary during movement of said stripping-off tray in said first direction for transfer of the respective row of pieces to said transfer roller conveyor.

4. The method defined in claim 1 further comprising the step of moving said stripping blade in said first direction for stripping of said logitudinal strips selectively onto at least one transfer roller conveyor.

* * * * *